May 13, 1947.  P. F. HACKETHAL  2,420,424
HUB CONSTRUCTION
Filed Feb. 18, 1942  3 Sheets-Sheet 1
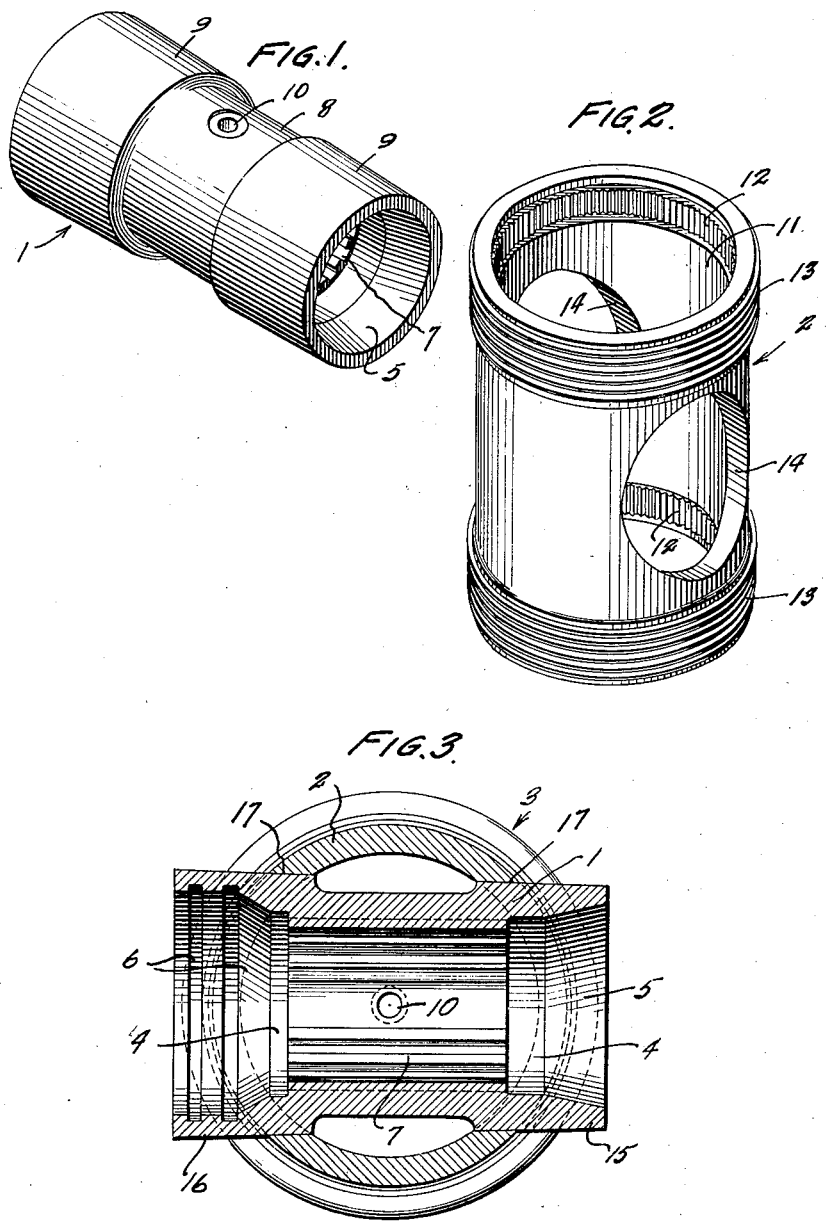
Inventor
PAUL F. HACKETHAL
By Semmes, Keegin, Bealer & Semmes
Attorneys May 13, 1947.　　P. F. HACKETHAL　　2,420,424
HUB CONSTRUCTION
Filed Feb. 18, 1942
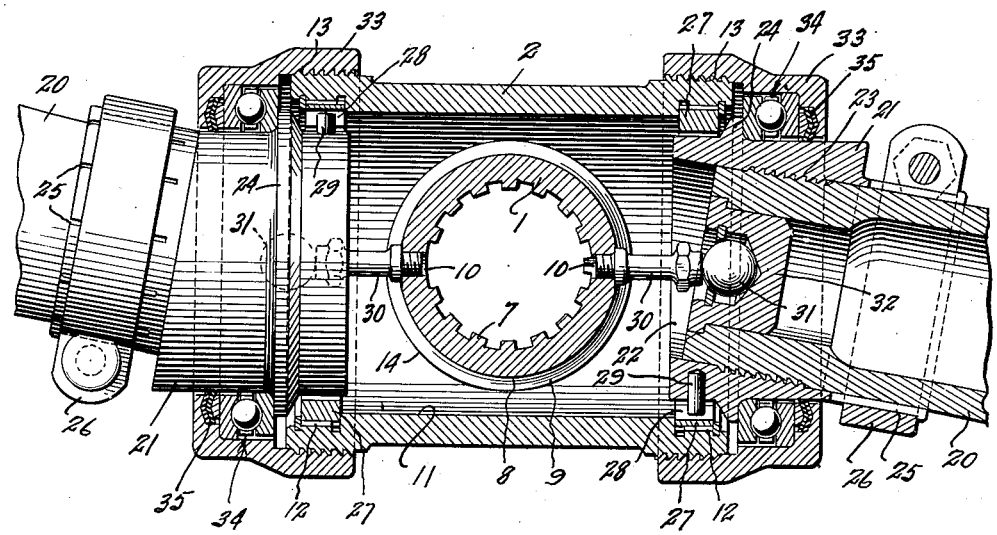
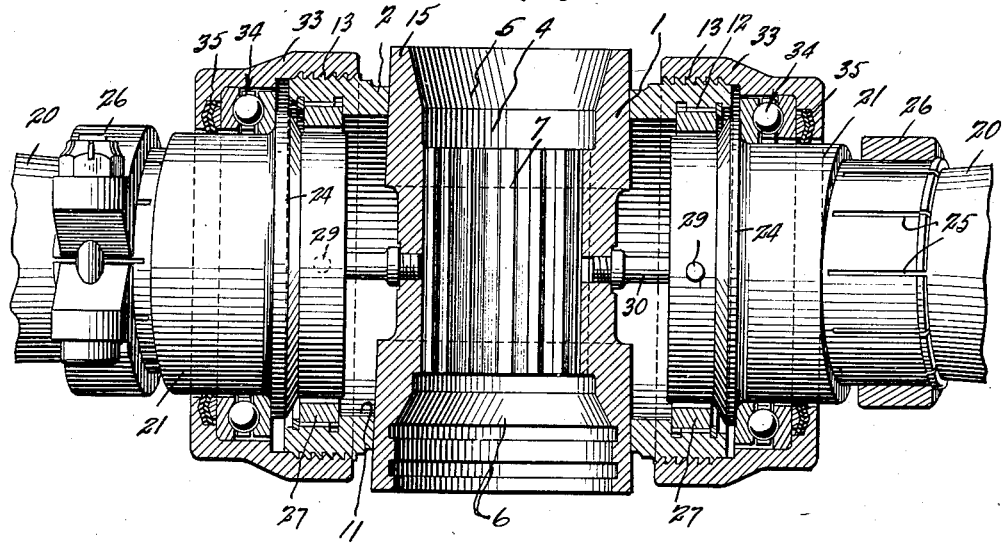
Inventor
PAUL F. HACKETHAL
By Semmes, Keegin, Beale & Semmes
Attorneys May 13, 1947.　　P. F. HACKETHAL　　2,420,424
HUB CONSTRUCTION
Filed Feb. 18, 1942　　3 Sheets-Sheet 3

Inventor
PAUL F. HACKETHAL
By Semmes, Keegin, Beale & Semmes
Attorneys

Patented May 13, 1947

2,420,424

UNITED STATES PATENT OFFICE 2,420,424

HUB CONSTRUCTION

Paul F. Hackethal, Cockeysville, Md., assignor to Everel Propeller Corporation, Baltimore, Md., a corporation of Maryland Application February 18, 1942, Serial No. 431,439

2 Claims. (Cl. 170—173)

The present invention relates to hub construction and more particularly to a built-up hub for mounting propeller blades, rotors, or the like, to aircraft.

Heretofore in manufacturing propeller hubs, the practice has been to utilize a forging often weighing as much as 500 pounds for the rough hub. This forging is then machined to produce the final hub which, after machining, will weigh approximately upwards to 80 pounds. This machining operation is costly both from waste of material and the difficulty of removing unnecessary metal, especially from the interior of the hub and around the junctures of the shaft and blade bosses. This last operation requires difficult and time consuming milling and profiling. Furthermore, in machining the hub from a solid forging it is practically impossible to remove all metal which is not necessary for the strength of the hub.

The principal object of this invention is to avoid the difficulties above mentioned in fabricating propeller hubs.

A further object is to provide propeller hubs fabricated from readily available metals, such as bar stock, or tubing, thereby obviating the forging heretofore necessary.

Another object is to produce a propeller hub with the minimum of waste of time, labor and material.

A still further object is to provide a propeller hub which carries the minimum of weight for its required strength.

With these and other objects in view, the broad concept of this invention comprises fabricating propeller hubs in separate parts, each of which is substantially completely machined before assembly, then assembling these parts by suitable methods, such as brazing or other methods, to form the complete hub. While the drawings and the following specification disclose a hub for mounting automatic variable pitch blades for two and three blade propellers, it must be understood that the scope of this invention shall be broad enough to cover other types of variable pitch propellers or fixed pitch propellers or rotors.

In the drawings:

Figure 1 is a perspective view of the shaft collar forming a part of my hub.

Figure 2 is a perspective view of the blade shell to be associated with the collar shown in Figure 1 to form a hub for a two blade propeller.

Figure 3 is a transverse sectional view through the completed two blade hub.

Figure 4 is a sectional view taken transversely through the blade shell of the hub shown in Figure 3 and showing mounted therein automatic variable pitch propeller blades.

Figure 5 is a view similar to Figure 4 but taken on a plane at right angles to that of Figure 4.

Figure 6:
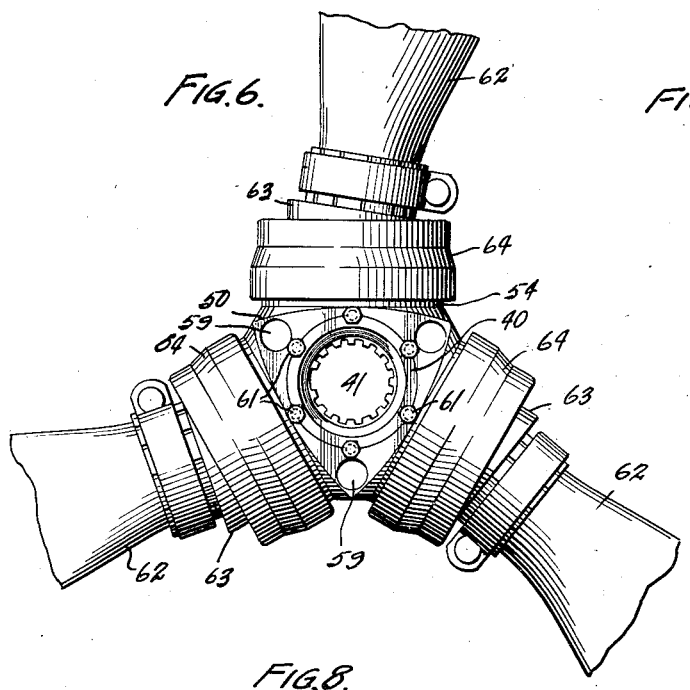
Figure 6 is a front elevational view of a three blade hub.
Figure 7:
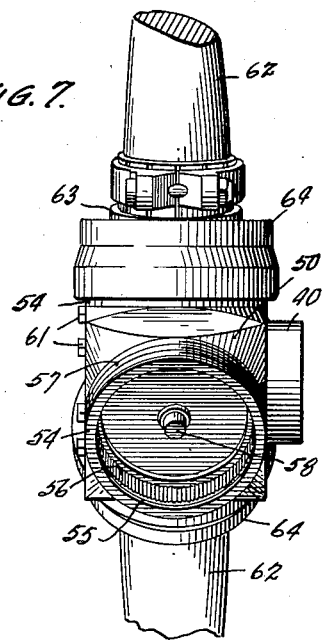
Figure 7 is a side elevational view of the hub shown in Figure 6 with one of the blades removed.

Referring to Figures 1, 2 and 3 of the drawings, the propeller hub comprises a shaft collar designated generally 1 and a blade mounting shell designated generally 2, which in their completed forms are assembled to form a propeller hub 3 as shown in Figure 3. The collar 1 is centrally bored throughout its length as indicated at 4. The inner and outer ends 5 and 6 of the bore 4 are suitably machined as shown in Figure 3 and the intermediate portion 7 is splined to provide for attachment to a propeller shaft.

The periphery of the collar 1 is reduced as at 8 to eliminate excess weight and to provide end flanges 9. The flanges 9 are provided with a continuous taper. Diametrically opposed counterbored sockets 10 are provided in the reduced portion 8, the purpose of which will be described later.

The shell 2 (illustrated in figure) is internally bored throughout its length as indicated at 11 and each end of this bore is provided with a slightly enlarged serrated portion 12. Exterior screw threads 13 are provided at each end of the shell 2. The shell 2 is transversely bored intermediate its ends as indicated to provide aligned openings 14, the openings being tapered to correspond with the taper of the flanges 9 on the shaft collar 1.

After the collar 1 and the shell 2 have been thus machined, they are assembled as shown in Figure 3 so that the ends of the collar 1 project beyond the shell 2 to form the usual shaft bosses 15 and 16. The juncture between the collar and the shell, which is indicated 17, is then secured, as by copper brazing, in an atmosphere of hydrogen to produce a substantially finished hub which will require only superficial cleaning and polishing on non-working surfaces to completely finish.

It will be noted from Figures 3 and 4 that the whole interior of the hub, with the exception of the tubular shaft collar, has been removed, thereby providing a minimum of weight. While it has been stated that a tapered, brazed fit between the shaft collar and the blade shell has been provided, other means of attachment which may occur to those skilled in such operations may be likewise provided. For instance, the flanges 9 and the bore 14 may be splined or knurled to further assure against slippage.

Figures 4 and 5 of the drawings illustrate the application of the hub above described to automatic variable pitch propeller blades as set forth in my application, Serial No. 292,148, filed August 26, 1939.

To mount the propeller blades 20, I provide an annular sleeve 21 which is bored at 22 at an angle to its longitudinal axis. The bore 22 is provided with internal screw threads 23 and an external annular flange 24 adjacent its inner end. The outer end of the sleeve 21 is slotted as at 25, which slotted portion is surrounded by a clamp ring 26.

The shank of the blade 20 is externally threaded and screwed into the threaded portion 23 of the bore 22 until its desired position and initial pitch is effected, and the collar 26 is tightened around the slotted end of the sleeve 22 to secure the blade in this position.

Ring members 27, externally serrated to engage the serrated portions 12 of the shell 2, and which are provided with an internal slot 28, are fitted into the ends of the shell 2. The ring 27 is positioned so that the slot 28 will engage a radial pin 29 secured to the inner end of the sleeve 21 when in its operative position to limit the pitch change movement of the propeller blade.

Thrust posts 30 are secured in the apertures 10 of the collar 1 and are of such length as to engage balls 31 retained in flanged cups 32 provided in the inner end of the propeller blades 20. These posts 30 and balls 31 provide a limit for internal radial thrust of the propeller blades when the blades are in their static position. Sleeves 21 are inserted in each end of the shell 2 and are held in the shell 2 for rotational movement about the pitch change axes of the blades by means of internally flanged caps 33. A combined radial and thrust bearing indicated generally as 34 and a suitable oil packing ring 35 are provided between the flange 24 of the sleeve 21 and the flange of the cap 33.

Figures 6 through 9 illustrate my method of fabricating a hub for three blade propellers, which method is equally adaptable to propellers of four or more blades. Here, too, automatic variable pitch blades are shown in conjunction with the hub, but obviously by suitable machining, the hubs may be made adaptable to fixed blade propeller constructions or blades employing other methods of changing their pitch.

The shaft collar 40 is somewhat similar to the collar 1, being internally bored as at 41 and machined as at 42, 43 and 44 for attachment to the crank shaft of the aircraft engine. The periphery of the collar 40 is reduced at 45 to reduce its weight and to form external annular flanges 46 and 47. These flanges 46 and 47 may be tapered in the manner described above for the flanges 9, or may be turned cylindrical.

The shell 50 may be formed of suitable stock material, but in this case it may be advisable to employ a forging of substantially the size of the finished shell. The shell 50 is transversely bored as at 51 to provide slight internal flanges 52 and 53 adjacent its inner and outer faces. These flanges 52 and 53 may be taper bored or bored cylindrical, depending on the shape of the flanges 46 and 47 of the shaft collar 40. If bored cylindrical, a press fit is provided to effect a tight union between the two parts of the completed hub.

Figure 8:
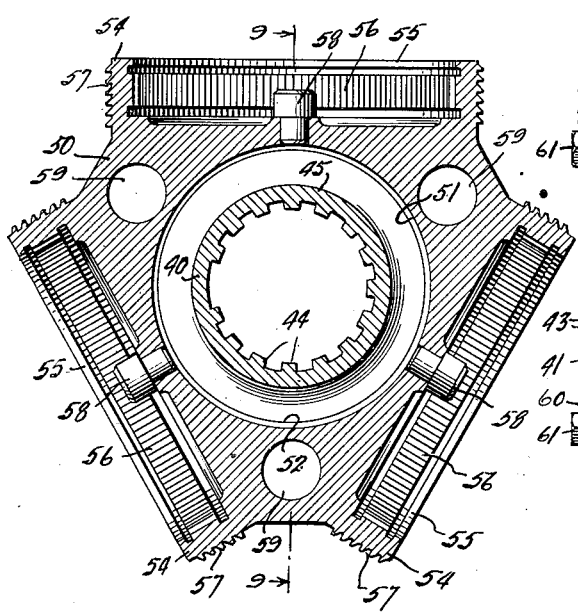
Figure 8 is a transverse sectional view through the hub shown in Figure 6.
Figure 9:
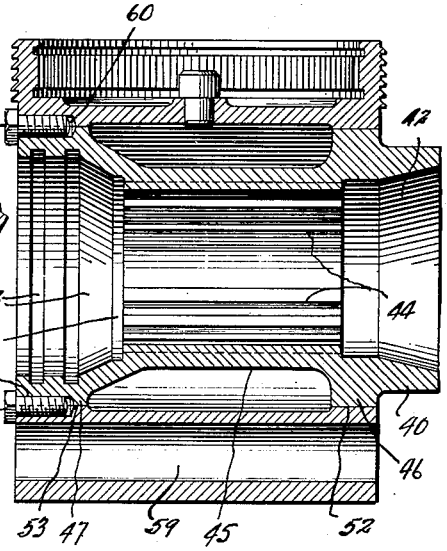
Figure 9 is a sectional view taken along the line 9—9 of Figure 8 looking in the direction of the arrows.

Machined around the periphery of the shell 50 are a plurality of equally spaced blade mounting bosses 54 which are recessed at 55. The inner walls of the recesses 55 are provided with knurled portions 56 corresponding to, and for the same purpose as, the knurled portions 12 of the shell 2. The outer peripheries of the bosses 54 are threaded as shown at 57 for securing the blades to the hub. A radial thrust post 58 is located centrally in the base of each recess 55. As shown in Figures 8 and 9, additional surplus metal may be removed from the shell by transverse borings as indicated at 59.

After the parts 40 and 50 have been thus machined, they are assembled by pressing the collar 40 into the bore 51 and then drilling and tapping a series of screw threaded holes 60 around the juncture of the outer edge of the flange 47 and the bore 53. These tapped holes 60 are fitted with screws 61, both to prevent rotational and longitudinal misalignment of the collar 40 with respect to the shell 50.

Figure 6 shows the hub fitted with blades 62 held in pitch changing collars 63 secured in the hub by means of caps 64 in a manner identical with that described with reference to Figures 4 and 5.

Thus, it will be seen that by building up a propeller hub from parts pre-machined from stock metal, as above set forth, I can produce a hub which will effect substantial savings in material, time and cost of manufacture, which will be lighter in weight and still retain all necessary structural characteristics of a hub made by professional methods. By obviating the use of a forging for the rough hub and employing my method of fabrication, the several intricate, slow and costly machine steps to finish the hub are reduced virtually to a simple lathe operation. Likewise, by utilizing stock material, such as tubing or bar of approximately the finished size of the hub rather than these massive forgings used for unitary fabrication of hubs, the loss of approximately 350% of metal discarded as waste therefrom is avoided. Again, by pre-machining the parts before assembling the hub, unnecessary metal may be removed, which would virtually be impossible to remove from a unitary structure, resulting thereby in the substantial reduction in weight.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A hub for an aircraft automatically variable pitch propeller comprising a unitary tubular blade-mounting member, a blade receiving socket in each end of the member, a blade carrying sleeve rotatively mounted in each socket, ball bearings interposed between the sockets and sleeves to reduce friction and afford free rotation of said sleeves in the sockets, each of said sleeves having a blade receiving bore, the axis of which is inclined to the axis of said socket, a blade in each bore, said blade receiving sockets adapted to contain a lubricant for said bearings to insure free rotation of said sleeves in the sockets under the action of pitch changing forces on the blades during rotation of the propeller, said blade mounting member having axially aligned openings in diametrically opposite walls thereof, a unitary tubular shaft-coupling member inserted through said openings, both of said members having exteriors which are surfaces of revolution about the axis of the respective members, said shaft-coupling member being diametrically reduced externally over that portion of its length defined by the inner walls of the blade-mounting member, and a fused joint between the two members to secure and form said members into an integral unitary hub structure having the desired strength requirements, said joint being completely oil tight and preventing passage of the lubricant between the two members along their lines of juncture to insure the retention of lubricant within said sockets for the lubrication of the bearings during propeller operation.

2. A hub for an aircraft automatically variable pitch propeller comprising a unitary tubular blade-mounting member, a blade receiving socket in each end of the member, a blade carrying sleeve rotatably mounted in each socket, ball bearings interposed between the sockets and sleeves to reduce friction and afford free rotation of said sleeves in the sockets, each of said sleeves having a blade receiving bore, the axis of which is inclined to the axis of said socket, a blade in each bore, said blade receiving sockets adapted to contain a lubricant for said bearings to insure free rotation of said sleeve in the sockets under the action of pitch changing forces on the blades during rotation of the propeller, said blade mounting member having axially aligned openings in diametrically opposite walls thereof, a unitary tubular shaft-coupling member inserted through said openings, both of said members having exteriors which are surfaces of revolution about the axis of the respective members, and a fused joint between the two members to secure and form said members into an integral unitary hub structure having the desired strength requirements, said joint being completely oil tight and preventing passage of the lubricant between the two members along their lines of juncture to insure the retention of lubricant within said sockets for the lubrication of the bearings during propeller operation.

PAUL F. HACKETHAL.

REFERENCES CITED

The following references are of record in the file of this patent:

UNITED STATES PATENTS

| Number | Name | Date |
| --- | --- | --- |
| 1,509,804 | Dicks | Sept. 23, 1924 |
| 2,228,524 | Lampton | Jan. 14, 1941 |
| 1,865,170 | Carter | June 28, 1932 |
| 1,569,800 | Dicks | Jan. 12, 1926 |
| 1,608,755 | McCauley et al. | Nov. 30, 1926 |
| 1,129,989 | Kelsey | Mar. 2, 1915 |
| 2,231,888 | Couch | Feb. 18, 1941 |
| 1,777,455 | Tarbox | Oct. 7, 1930 |
| 1,470,508 | Steenstrup | Oct. 9, 1923 |
| 334,178 | Loomis | Jan. 12, 1886 |
| 678,458 | Daley | July 16, 1901 |
| 1,385,231 | Skolnik | July 19, 1921 |
| 1,082,750 | Jacomy | Dec. 30, 1913 |
| 1,565,374 | Kramer | Dec. 15, 1925 |
| 1,884,984 | Stone | Oct. 25, 1932 |
| 1,958,336 | Greene | May 8, 1934 |

FOREIGN PATENTS

| Number | Country | Date |
| --- | --- | --- |
| 526,167 | Great Britain | Sept. 12, 1940 |
| 10,098 | Great Britain | Apr. 28, 1909 |
| 485,978 | Great Britain | May 27, 1938 |
| 486,614 | Great Britain | June 8, 1938 |